A. T. NUTE.
Tree-Protector.
No. 18,598.    Patented Nov. 10, 1857.
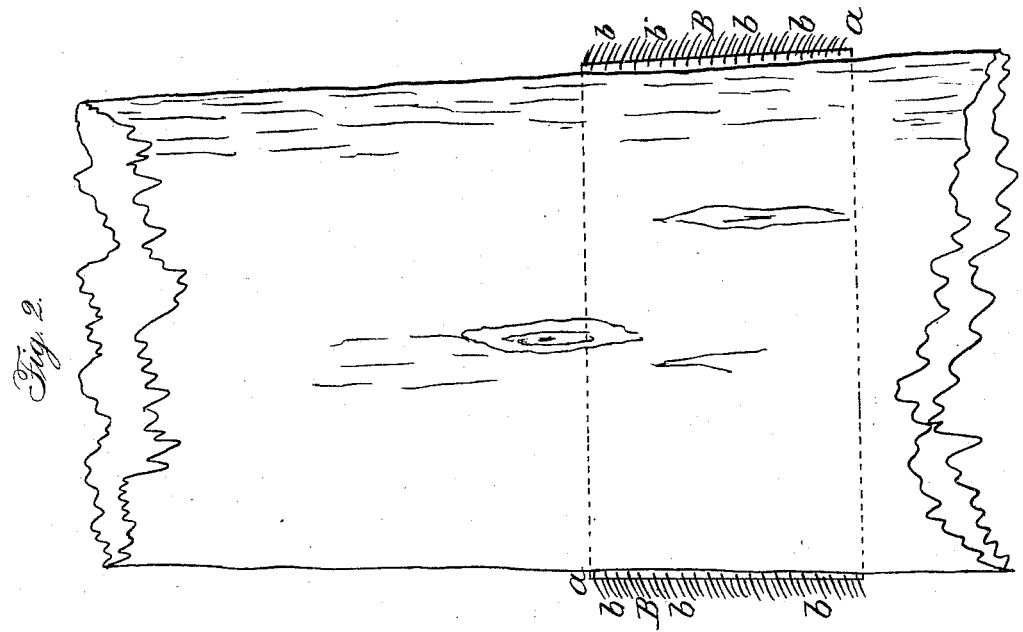
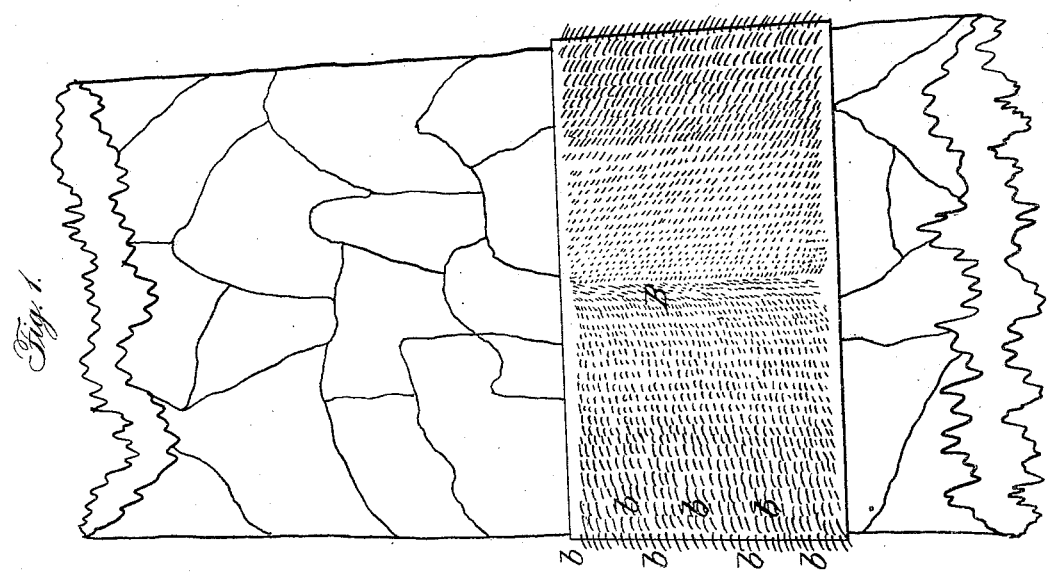

UNITED STATES PATENT OFFICE.

ANDREW T. NUTE, OF ROXBURY, MASSACHUSETTS.

IMPROVEMENT IN THE MODE OF PROTECTING TREES FROM CANKER-WORMS, &c.

Specification forming part of Letters Patent No. 18,598, dated November 10, 1857.

*To all whom it may concern:*

Be it known that I, ANDREW T. NUTE, of Roxbury, in the county of Norfolk and State of Massachusetts, have invented a new and useful Improvement or Mode of Protecting Trees from Canker-Worms or various other Worms; and I do hereby declare that the same is fully described and represented in the following specification and the accompanying drawings, of which—

Figure 1 is a represention of a portion of a trunk of a tree having my invention applied to it. Fig. 2 is a vertical section of the same.

My improved mode of protecting a tree from canker-worms is to apply and nail or otherwise fasten closely around its trunk, and at a short or any proper distance above the ground, a band or fillet of card-teeth, such as are generally used for carding cotton or wool, such band or fillet being shown at B in the drawings, and consisting of a strip of leather, $a$, or other suitable flexible material and numerous pointed wires $b\ b$ extended therefrom. The sharper the points of the said wires are made the better they operate, such operating to the best advantage when the several wires are arranged at such distances apart in the leather that the foot of a canker-worm may rest on only one of them at a time. In order that the worm may more readily slip off the wires, they may be so arranged as to incline downward from their roots to their points.

I have found that pointed wires applied to a tree in manner as above described present a complete obstruction to the ascent of a canker worm. Besides this they are very durable and for a long time serve as a protector to the tree.

I am fully aware that for a considerable period of time it has been the practice to put around a tree a belt or fillet of cotton-batting in order to obstruct the ascent of worms up the tree. I am also aware that bands of canvas smeared with tar and annular troughs containing oil or other liquid matter or matters have been extended around trees for such purpose. Therefore I do not claim such. My invention or improvement differs both in construction and operation essentially from either of such last-mentioned modes of protecting trees, for by means of metallic wires or points or strips of card-teeth applied to a tree, and with their teeth projecting outward, the animal on attempting to ascend on the points injures himself, and to such an extent as to prevent him from passing over the obstruction. By being thus injured or wounded he soon loses his foothold and falls off the points and to the ground.

I claim—

My improved method of protecting a tree from the ascent of canker-worms, the same consisting in applying finely-pointed metallic wires or one or more strips of card-teeth to the same, substantially as described.

ANDREW T. NUTE.

Witnesses:
R. H. EDDY,
F. P. HALF, Jr.